Oct. 14, 1969　　　E. B. NICHOLS　　　3,472,359
PREPARED PAINTS AND COLOR KITS FOR ARTISTS
Original Filed Jan. 18, 1963

INVENTOR
EDGAR B. NICHOLS
BY
ATTORNEYS

United States Patent Office 3,472,359
Patented Oct. 14, 1969

3,472,359
PREPARED PAINTS AND COLOR KITS
FOR ARTISTS
Edgar B. Nichols, 325 W. Main St.,
Moorestown, N.J. 08057
Original application Jan. 18, 1963, Ser. No. 252,456, now Patent No. 3,359,228, dated Dec. 19, 1967. Divided and this application Dec. 8, 1967, Ser. No. 719,802
Int. Cl. B44d 3/04
U.S. Cl. 206—1.8
4 Claims

ABSTRACT OF THE DISCLOSURE

An artist's kit comprising an outer container having a plurality of bottles fitted in the container shaped so as to provide a series of open spaces between the bottles to receive solid colors in rod-like form.

---

This application is a division of my application Ser. No. 252,456, filed Jan. 18, 1963, now U.S. Patent No. 3,359,228, issued on Dec. 19, 1967.

This invention relates to prepared paints for artists for use in lieu of the conventional oil and water colors.

The color solution which is applied to the face of the canvas or other surface in accordance with the present invention consists essentially of a nonaqueous, volatile solvent, such as methanol, containing nylon and pigments or dyes.

In my pending application filed concurrently herewith I have described the manufacture of coating compositions consisting essentially of nylon and methanol with added coloring material, and also processes of making various kinds of sheet material from such compositions and the prepared paints of this application are made in film form by the processes described in said pending application. When used by the artist, a small quantity of the film material of the desired color is dissolved in the volatile solvent in such proportions as to make a liquid of the desired fluidity.

I have discovered that a solution of nylon in methanol, or an equivalent solvent, will retain the pigments and dyes commonly used in artists' paints in uniformly distributed solution or suspension until evaporated to dryness and that the dried residue when redissolved in the solvent will have the same color and be otherwise identical with the original solution. To facilitate rapid evaporation of the solvent in the making of the solid colors the original solution is made of a concentration most favorable for film formation and is spread on a film forming surface, and the solvent evaporated under a solvent recovery unit. When used by the artist the film so produced is broken or cut into small sized flakes and redissolved in the solvent.

To facilitate the use of the colors by artists I have designed a novel color kit. In the accompanying drawings I have shown two examples of my color kits and in the said drawings.

Figure 1:
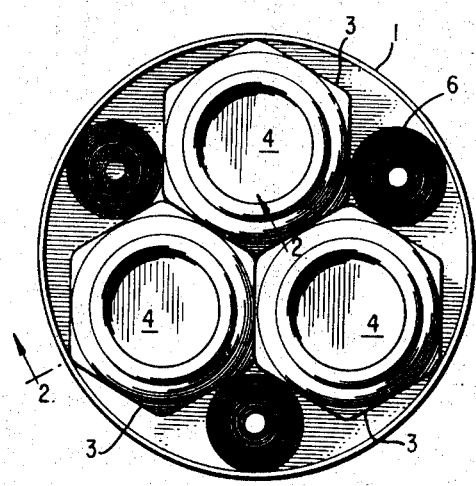
FIG. 1 shows a container with bottles for three colors and three rolls of color strips.
Figure 2:
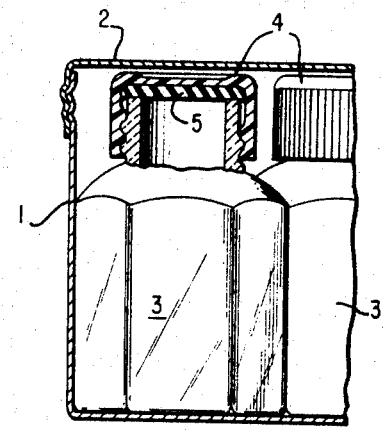
FIG. 2 is a section on line 2—2 of FIG. 1.

Referring to the drawings, particularly to FIG. 1, 1 indicates the outer container of the kit which, as shown, is a round sheet metal can with a cover 2 threaded on the neck of the can. Fitted in the can 1 are three hexagonal bottles 3 with screw caps 4. Rubber disks 5 are fitted in the caps so that the bottles will be air tight when closed.

The spaces defined by the wall of the outer container and the adjacent faces of the bottles form separate compartments for the prepared solid coloring material, as shown at 6. The coloring material is preferably in the form of rolled films of a width slightly less than the depth of the container 1. In the kit shown in FIG. 1, the colors are the three primary colors, red, blue and yellow.

Figure 3:
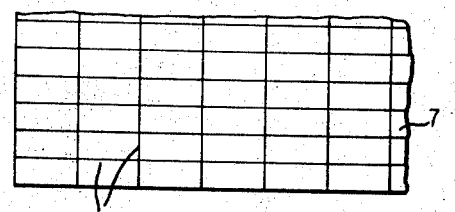
FIG. 3 shows a colored sheet or strip, which can be rolled and stored ready for use as shown in FIG. 4.
Figure 4:
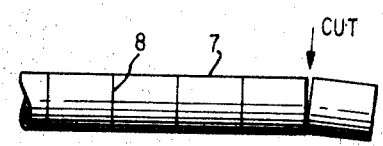
FIG. 4 shows the rolled sheet or strip ready to be cut into small segments.
Figure 5:
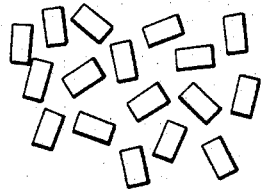
FIG. 5 shows small segments cut, ready for dissolving quickly in the solution.

In FIG. 3 I have shown a portion of a color film before rolling. The flat film 7 is preferably scored with cross lines 8, in the casting operation or as the film is rolled to facilitate cutting the film into fragments for rapid solution in the solvent. The fragments produced by cutting along the score lines are of equal size and weight so that the artist can accurately reproduce any desired blend. To use the kit, when first acquired the artist puts in the several bottles the desired quantity of the colored fragments, such as shown in FIG. 5, and adds the amount of solvent required to produce a solution of the desired concentration. For adding the solvent the cap of the bottle provides a convenient measuring cup. The bottles are then placed in a water bath at about 150° F. and the color flakes dissolve quickly in the solvent.

In using the color kit, the artist can prepare solutions of the three primary colors and obtain the secondary colors and slides by mixing the liquids, as applied, in the same manner as liquid paints are now applied. If desired, however, the artist can place in a single bottle predetermined quantities of the solid flakes of the colors to be blended so as to have a liquid paint of the desired color and shade which is accurately reproducible whenever desired. This is particularly desirable in painting large murals where there are extended areas of the same color.

In using my improved artists' paint there is no loss of pigment whatsoever. Any excess color solution left in the bottle can be made into a film by merely pouring the liquid on a smooth surface such, for example, as the glass top of a desk or table. The solvent will evaporate rapidly, leaving a solid film which strips readily from the glass surface. This film can be cut into strips and rolled into sticks for use as desired.

Figure 6:
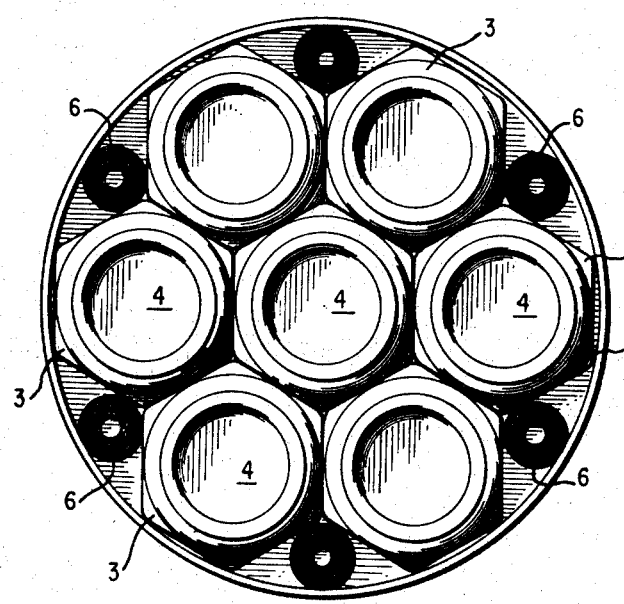
FIG. 6 shows a bottle container for the three bottles of primary colors, and four bottles of secondary colors which are used for mixing or blending.

In the modified structure as shown in FIG. 6, seven hexagonal bottles are used instead of three. In using this kit the middle bottle can be filled with clear solution for preparing color solutions in the other bottles. In using this kit three of the bottles can be used for the primary colors and the other three can be used for the blended colors which are to be employed in the largest quantities.

The dried film material keeps indefinitely without being hermetically sealed. The material is not hygroscopic and remains non-tacky and hard at ordinary room temperatures. The liquid solutions are also stable and there is little or no settling of the pigment suspension even on long standing. In cold weather the color solutions become somewhat more viscous, but this can be readily corrected by placing the bottles in a water bath before using.

In preparing the red color, for example, the original film forming solution is prepared by a solvent consisting of methanol containing one percent phenol, ten percent of nylon by weight and three percent by weight of a red pigment such as monestral red. The solution is boiled in a vessel equipped with a reflux condenser as described in my above-mentioned co-pending application until the nylon and pigment are uniformly dissolved and suspended, respectively, in the solution. The film of .005 inch thickness is then formed by pouring the solution on a traveling casting surface and the solvent evaporated by passing the traveling surface through a heated tunnel equipped with a solvent recovery attachment. The sheet of film as it is stripped from the casting surface is fed through scoring rolls which form a cross pattern with score marks on the sheet. The sheet is then fed through slitting knives which cut it into strips of the desired width, which strips are wound into rods as shown in FIG. 5.

For making the blue and yellow sticks the same procedure is followed except that in lieu of the red pigment blue and yellow pigments of the same type are employed.

In the foregoing specification I have described the preferred manner of making my improved paints and the preferred manner of using the same. It will be understood however that the invention is not limited to the forms and methods therein described. Instead, for example, of preparing the solid colors in the form of a film the nylon-pigment solution may be extruded in rod or filament form and evaporated to dryness. Also, of course, the arrangement of the containers for the solvent and paint solutions may be variously modified.

I claim:

1. An artist's kit comprising an outer container, a plurality of bottles fitted in such container, said bottles being shaped to provide a series of open spaces between the bottles of a shape to receive solid colors in rod-like form and containing solid colors in rod-like form in at least some of said spaces.

2. The kit according to claim 1 in which the solid colors in rod-like form comprises a film wound into rod-like form.

3. The artist's kit of claim 2 in which the rod-like form is scored into equal sections to facilitate removal of equal portions of color for subsequent mixing.

4. The kit according to claim 1 in which the outer container is of circular cross-section and the bottles are of hexagonal cross-section.

References Cited

UNITED STATES PATENTS

| 592,592 | 10/1897 | Morse | 206—56 |
| 2,050,394 | 8/1936 | Straubel | 206—58 |
| 2,724,494 | 11/1955 | Graff | 206—4 |

FOREIGN PATENTS 1,120,576   4/1956   France.

WILLIAM T. DIXSON, JR., Primary Examiner

U.S. Cl. X.R.

220—17; 260—33.4